United States Patent [19]

Sager et al.

[11] Patent Number: 4,979,190

[45] Date of Patent: * Dec. 18, 1990

[54] METHOD AND APPARATUS FOR STABILIZED DATA TRANSMISSION

[75] Inventors: David J. Sager, Acton; Leon D. Hesch, Leominster; Andrew D. Ingraham, Acton, all of Mass.; William A. Samaras, Seabrook Beach, N.H.

[73] Assignee: Digital Equipment Corporation, Maynard, Mass.

[ * ] Notice: The portion of the term of this patent subsequent to Mar. 7, 2006 has been disclaimed.

[21] Appl. No.: 303,846

[22] Filed: Jan. 30, 1989

Related U.S. Application Data

[63] Continuation of Ser. No. 176,570, Apr. 1, 1988, Pat. No. 4,811,364.

[51] Int. Cl.$^5$ .............................................. H04L 7/04
[52] U.S. Cl. ........................................ 375/106; 371/1; 375/111
[58] Field of Search .................. 371/1; 370/100, 100.1, 370/105.2, 105.3, 108; 375/106, 111, 119, 38, 118; 364/131, 136, 704; 307/269, 590, 591, 595, 596, 600, 601, 602

[56] References Cited

U.S. PATENT DOCUMENTS

| | | | |
|---|---|---|---|
| 3,622,885 | 11/1971 | Kruszynski | 375/38 |
| 4,637,018 | 1/1987 | Flora et al. | 371/1 |
| 4,641,318 | 2/1987 | Addeo | 375/38 |
| 4,656,612 | 4/1987 | Allan | 307/591 |
| 4,700,347 | 10/1987 | Rettberg et al. | 371/1 |
| 4,714,924 | 12/1987 | Ketzler | 307/595 |
| 4,754,164 | 6/1988 | Flora et al. | 307/602 |
| 4,885,485 | 12/1989 | Leake et al. | 307/596 |

FOREIGN PATENT DOCUMENTS 0213641 3/1987 European Pat. Off. .

OTHER PUBLICATIONS

Electronic Letters, vol. 22, No. 10, May 8, 1986, pp. 543-544.

Primary Examiner—Benedict V. Safourek
Attorney, Agent, or Firm—Kenyon and Kenyon

[57] ABSTRACT

Data can be accurately transmitted between two subsystems even if the clock skew between the two subsystems is larger than one clock cycle by the method of the invention. In one embodiment data is loaded into N state devices in the sending subsystem while the receiver recovers data from the sending state devices in rotation with an N input multiplexer. Another embodiment forwards a clock signal from the sending subsystem along with a data vector of N state signals for recovery by a pair of state devices capturing data on the rising and falling edges of the forwarded clock. A further embodiment achieves double bandwidth by forwarding two clock signals.

15 Claims, 9 Drawing Sheets

METHOD AND APPARATUS FOR STABILIZED DATA TRANSMISSION

This is a continuation of application Ser. No. 176,570 filed Apr. 1, 1988, now U.S. Pat. No. 4,811,364, issued Mar. 7, 1989.

FIELD OF THE INVENTION

The invention relates to a digital computer system and, more particularly, to a digital computer system including two subsystems. The invention provides an efficient means to accurately transmit data between two subsystems even if the clock skew between the two subsystems is larger than one clock cycle.

BACKGROUND OF THE INVENTION

Previously designed methods of interfacing between two subsystems operating at low speeds have been successful in achieving the desired result. In low speed systems, clock skew between subsystems was minimal in that the resultant clock skew was only a portion of the entire clock cycle time. Thus, data was stable long enough to allow a skewed clock to capture the data in a state device and safely meet its setup and hold time requirements.

Interfacing between subsystems becomes more critical as the interfacing subsystems increase their operating speed. One or both of the subsystems may actually be asynchronous, they may both be synchronous on different clocks, simply related or unrelated to each other or they may both be operating under the same clock but there is high clock skew between them. In any of the above situations, the interfacing problem exists.

When data rates are high, there is frequently an interfacing problem because the data from the sending subsystem is not stable long enough to meet the receiving subsystem's state device's setup time requirements. By conventional means, data would be stable for at most one cycle time to the sending subsystem. If the clock skew between two subsystems is greater than this time, it is difficult for the receiver to capture the data.

While the prior art provides adequate means of interfacing between two subsytems, there is a need for advancement. In particular, in a high performance computer system, avoiding this interfacing problem is becoming more difficult as processing speeds are increasing. With increasing speeds of operation, it is imperative to ensure data stability across subsystem boundaries to meet the receiving subsystems data stable time requirements. The prior art does not adequately address these limitations.

SUMMARY OF THE INVENTION

Accordingly, it is a primary objective of the invention to ensure that data from the sending subsystem remains stable at the input of the state device on the receiving subsystem long enough to meet the device's triggering time requirements, thus accurately transmitting data between the subsystems even if the clock skew plus delays between the sending and receiving subsystem is more than one clock cycle.

Generally, in one embodiment, the present invention comprises N state devices and a N input multiplexer. The outputs of the N sending state devices are each connected, respectively, to one of the N inputs of the receiving multiplexer.

The method by which the invention generally maintains data stabilization across subsystem boundaries is by loading data into the N state devices, on the sending subsystem, in rotation, so that each state device is loaded every Nth clock cycle by clocks synchronous to the sending subsystem. The receiving subsystem recovers data from the sending state devices, in rotation, with the N input multiplexer. The output of the multiplexer is connected to a state device which is loaded every clock cycle by clocks synchronous to the receiving subsystem.

This embodiment of the invention provides a single logical data stream, sent from the sending subsystem on N wires, such that data for succeeding clock cycles is on the N wires in rotation. Accordingly, stable data is placed on N wires at the sending end for N clock cycles.

Another embodiment of the invention, which provides data integrity between two subsystems in a synchronous system, requires that a clock, generated by the sending system, be forwarded with the data and that each arrive at the receiving subsystem with approximately the same delay. This is accomplished by sending a data vector of N data signals along with the forwarded clock from the sending subsystem to the receiving subsystem. The state device that produces the forwarded clock is triggered one half cycle after the state devices that produce the data vector are triggered. The data vector is received into a pair of state devices in parallel, which alternate capturing data, one capturing data on the rising edge of the forwarded clock and the other capturing data on the falling edge of the forwarded clock. Thus, the output of each state device is stable for more than an entire cycle.

In yet another embodiment that achieves a double bandwidth bus between two subsystems, two clock signals are forwarded from the receiving subsystem, with data, such that each arrive at the receiving subsystem with approximately the same delay. This is accomplished by passing data, on the sending subsystem, through a multiplexer, which is controlled by clock signals A and B. This multiplexed data is sent, along with clocks A and B, to the receiving subsystem, which receives the data into a pair of parallel state devices controlled by clocks A and B. The data is then transferred from the state devices to state devices which are controlled by the receiving subsystem clock.

Accordingly, the present invention achieves maximum efficiency and flexibility for a computer system to accurately transmit data between subsystems operating at high speeds.

For a better understanding of the above and other features and advantages of the invention, reference should be made to the following detailed description of embodiments of the invention and to the accompanying drawings.

DETAILED DESCRIPTION

Figure 1:
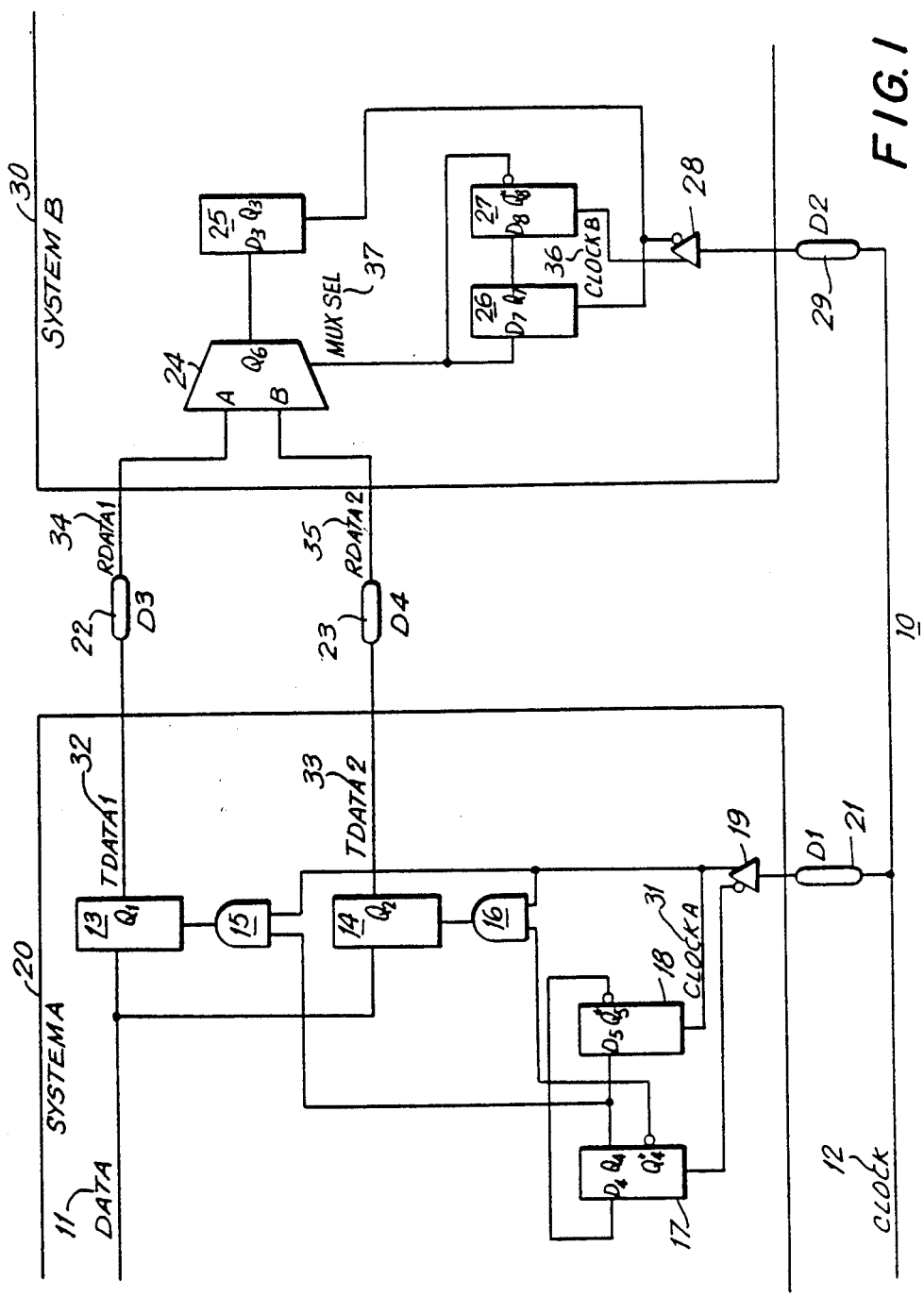
FIG. 1 is a block diagram of a first embodiment of the invention.

Referring now to the drawings and initially to FIG. 1, there is illustrated, an embodiment constructed according to the present invention. The arrangement 10 comprises two subsystems referred to as system A 20 and system B 30. System A 20 is further referred to as the sending subsystem and system B 30 is further referred to as the receiving subsystem. System A 20 sends data across two wires to system B 30. Both subsystems are driven by the system clock 12 which is subject to inherent, unknown delays as seen by system A 20 and system B 30.

System A 20 comprises four latches, two AND gates, and a differential driver. Two latches, 17 and 18, are configured in a divide by two arrangement. This is achieved by coupling latch's 17 $Q_4$ output to latch's 18 $D_5$ input, and coupling latch's 18 $Q_5^*$ output to latch's 17 $D_4$ input. The resultant output of this divide by two arrangement is a derivative of clock 12 at one half the frequency. A clock 12 is coupled to system A 20 by the differential driver 19 through an unknown delay of D1 21. The inverted output of driver 19 is coupled to the clock input of flip flop 17. The other output of the driver (hereinafter "CLOCK A 31") is coupled to the clock input of flip flop 18 and to an AND gate 15 and an AND gate 16. A data signal 11 is coupled to the inputs of latch 13 and latch 14. The clock input of latch 13 is controlled by AND gate 15. The clock input of latch 14 is controlled by AND gate 16. Each of these AND gates are controlled by the $Q_4$ or $Q_4^*$ output of latch 17, which gates CLOCK A 31 on or off thereby controlling the latching of data 11 into latch 13 and latch 14.

System A 20 is coupled to system B 30 by two data signals. The $Q_1$ output of latch 13 on system A 20 is coupled, via an unknown delay of D3 22, to the A input of a multiplexer 24 on system B 30. The $Q_2$ output of latch 14 on system B 30 is coupled, via an unknown delay of D4 23, to the B input of the multiplexer 24 on system B 30. Both system A 20 and system B 30 are synchronous systems that operate under clock 12, however, each system sees a different version of clock 12 due to delays in clock 12 as seen by system A 20 and system B System B 30 comprises of three latches, a multiplexer 24, and a differential driver 28. The latches, 26 and 27, are configured in a divide by two arrangement, thus, the $Q_8^*$ output of latch 27 is a derivative of the system clock 12 at one half the frequency. Clock 12 is coupled to system B 30 by the differential driver 28 through an uncertain delay of D2 29. The inverted output of the differential driver 28 is coupled to the clock input of latch 26 and the clock input of latch 25. The other input (hereinafter "CLOCK B 36") is coupled to the clock input of latch 27. The $Q_8^*$ output of latch 27 is coupled to the select input of the multiplexer 24 and controls which input will be allowed to pass through to the $Q_6$ output of the multiplexer 24. The multiplexer 24 is operated such that when the select line is high, the A input is selected, and when the select line is low, the B input is selected. The $Q_6$ output of the multiplexer 24 is coupled to the $D_3$ input of latch 25.

The latches in the invention are state devices whose operation can be described as follows. When the input presented to a latch through its clock input is high, the Q output follows the D input. That is, whatever data is presented at the latch's D input will be presented at the latch's Q output as long as its clock input is high. When its clock input goes low, whatever data was at its D input immediately prior to the clock going low, will be "captured" in the latch and presented at its Q output until the clock input goes high again.

Other devices can be used as the states devices in the present invention instead of the latches shown in FIG. 1. The same results would be achieved by replacing latches 17 and 18 with a single synchronous flip flop arranged as a one bit counter. Similarly, latches 13 and 14 could also be replaced with synchronous flip flops.

The receiving multiplexer 24 is operated such that its inputs are selected one at a time to appear valid at its output via its select input. For example, when the select line is high, the input to A will be passed through the multiplexer to the output. Alternatively, when the select line is low, the input to B will be passed through the multiplexer to the output.

The data 11 input to the first embodiment of the invention is such that it may change every cycle. A system with data potentially changing every clock cycle is called "full bandwidth".

The system clock 12 is a high speed clock. This high speed clock 12 requires that data 11, presented at the inputs of latch 13 and 14, be captured by latch 25 within the system cycle time. Due to inherent delays in the latches and multiplexer, and any inherent clock skew in the system, it is difficult to guarantee that valid data will be captured in the receiving latch in one cycle. For example, referring to FIG. 1, to guarantee that latch 25 will capture valid data in a conventional data transmission system, means that D1 21 delay plus D3 22 delay must be less than D2 29 delay plus the cycle time. However, in this embodiment of the invention, the D1 21 delay plus the D3 22 delay must be less than the D2 29 delay plus two times the cycle time. Thus, the time for latch 25 to capture valid data is increased by a factor of two. Pursuant to the invention, the data stable time at the receiver may be made as long as desired, by means of expanding to N data lines, thus ensuring that the stable time will cover the desired state device triggering time in the receiver, even if the clock skew is much larger than a cycle.

Figure 2:
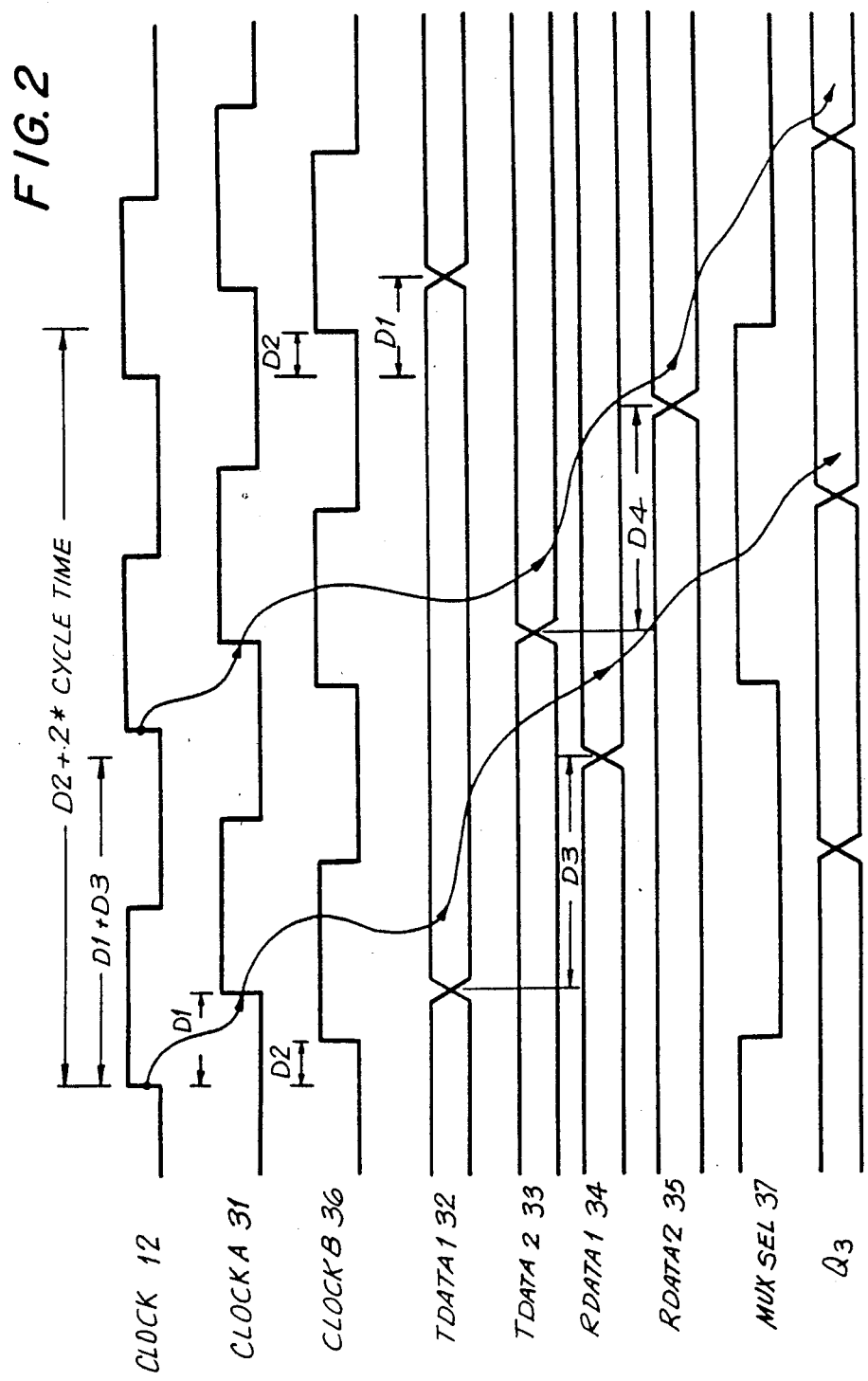
FIG. 2 is a timing diagram for the embodiment of FIG. 1.

Referring now to FIGS. 1 and 2 to describe the operation of the invention, the divide by two circuit arrangements in each subsystem, comprising latches 17 and 18 in system A 20 and latches 26 and 27 in system B 30, should be initialized so that the either the outputs of latches 17 and 26 or the outputs of latches 18 and 27 match. In this full bandwidth system, a new data word is transmitted every cycle, but, pursuant to the invention, the data stable time for each data item, as seen at the input of multiplexer 24, is twice the system cycle time.

Referring to FIG. 2, clock 12 is shown with clock A 31 and clock B 36, which are the same as clock 12, with a skew of D1 21 and D2 29, respectively. The rising edge of clock 12 results in new data 11 presented to the inputs of latch 13 and 14. This data passes through latch 13 when clock A 31 goes high, which is D1 21 time after clock 12 goes high. This output is represented by TDA- TA1 32 which is shown changing state on the rising edge of clock A 31. TDATA1 32 is transmitted through an uncertain delay, D3 22, and is then shown as RDATA1 34 which is the data as presented to the A input of the multiplexer 24. When MUX SEL 37 goes high, RDATA1 34 passes through the multiplexer 24 and is latched into latch 25, as shown, by the rising edge of clock B 36 inverted.

While the previously discussed data propagates from latch 13 to latch 25, more than one cycle time may have passed, thus, new data 11 would result from the rising edge of clock 12. This next data word passes through latch 14, instead of latch 13, because latch 13 is inhibited by the divide by two circuit. Thus, data 11 passes through latch 14 when clock A goes high, which is D1 21 time after clock 12 goes high. The output of latch 14 is represented by TDATA2 33 which is shown changing state on the rising edge of clock A 31. TDATA2 33 is transmitted through an uncertain delay, D4 23, and then is shown as RDATA2 35 which is the data presented to the B input of the multiplexer 24. When MUX SEL 37 goes low, RDATA2 35 passes through the multiplexer and is latched into latch 25, as shown, by the rising edge of clock B 36 inverted.

The above described sequence for transferring data from system A 20 to system B 30 works well provided certain conditions are met. The first condition is that the D1 21 delay plus the D3 22 delay must not exceed the D2 29 delay plus two times the cycle time. Likewise, the D1 21 delay plus the D4 23 delay must not exceed the D2 29 delay plus two times the cycle time. Additional requirements for correct operation are that the D1 21 delay plus the D3 22 delay must be greater than the D2 29 delay, and that the D1 21 delay plus the D4 23 delay must also be greater than the D2 29 delay.

The above described sequence of receiving and transmitting data is repeated for every cycle of the clock since the data can potentially change state every cycle in this full bandwidth system. The sequence of events, according to the invention, assures that received data will be stable at the receiving state device long enough to comply with such device's setup and hold time requirements. The setup time requirements are defined by the following equations to be:

$$D1+D3<D2+2* \text{ cycle time}$$

$$D1+D4<D2+2* \text{ cycle time}.$$

Similarly, the hold time requirements are defined by the following equations to be:

$$D1+D3>D2$$

$$D1+D4>D2.$$

Figure 3:
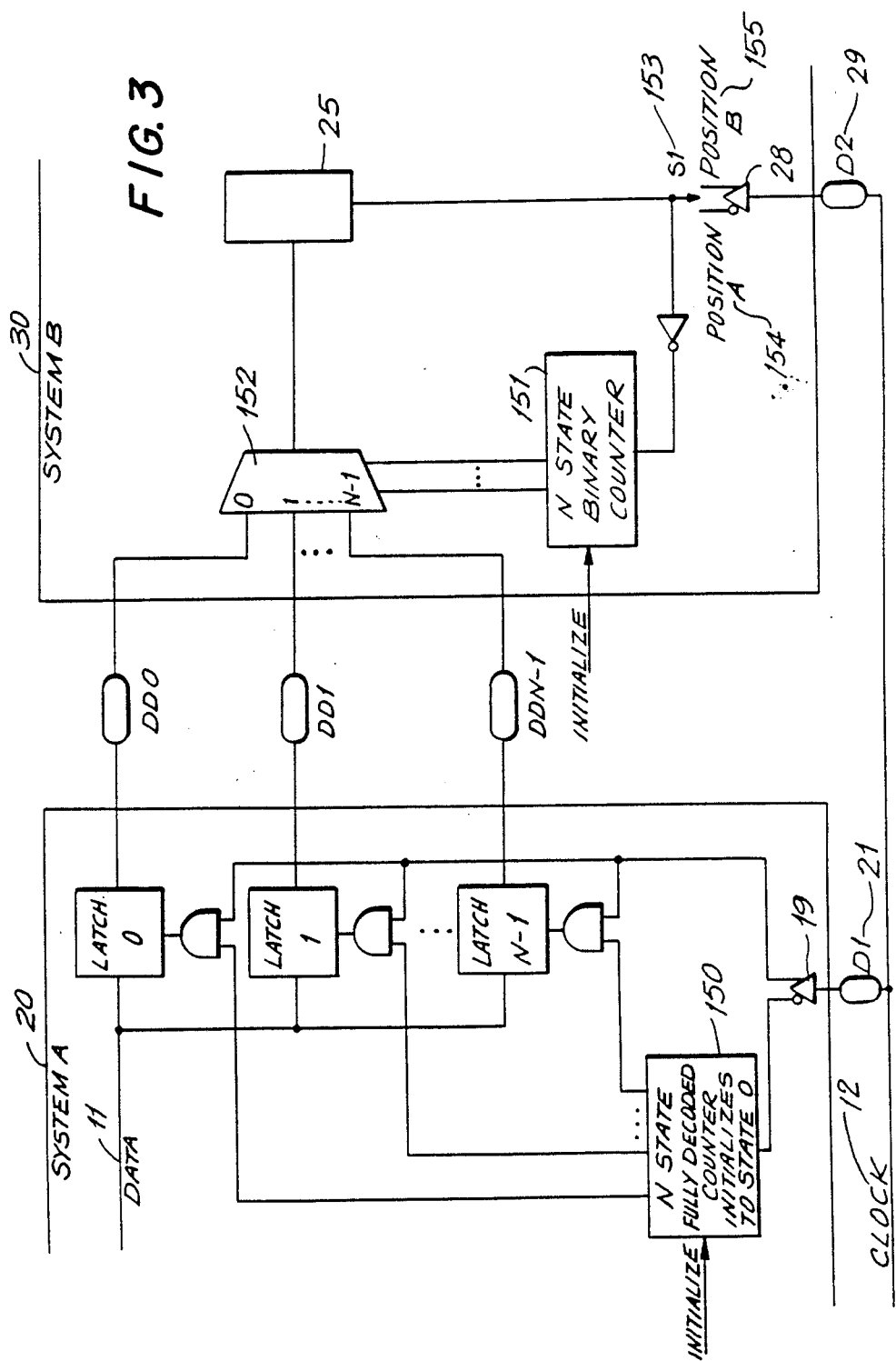
FIG. 3 is a block diagram of a generalization embodying the principles of the embodiment of FIG. 1.

Referring to FIG. 3, the embodiment of the invention described above can be generalized as shown. This generalization is accomplished by allowing for the expansion to N transmitting latches in system A 20 coupled to an N input multiplexer 152 in system B 30. The operation of this embodiment of the invention is basically the same as described above. A fundamental difference between FIG. 1 and FIG. 3 is that the divide by two circuit arrangements in system A 20 and system B 30 have been replaced by counters. In this embodiment, system A 20 utilizes an N state fully decoded counter 150 to control the gating of clock 12 to the N parallel latches configuration. This N state counter 150 must be initialized to zero. Similarly, system B 30 utilizes an N state binary counter 151 to control the selection of the N inputs of the multiplexer 152. This N state binary counter 151 must be initialized according to conditions which are described below.

In the embodiment of FIG. 3, N may be any integer greater than zero. For example, if N is equal to one, the embodiment would duplicate a conventional synchronous data transfer system. FIG. 1 is representative of the embodiment when N equals two.

An additional variable which must be defined is T which represents half cycles of transfer time. T is chosen to be any integer greater than zero that is not greater than two times N. FIG. 1 is an example of T chosen to have the value of four.

Referring again to FIG. 3, the N state binary counter 151 in system B 30 must be initialized. The state which the counter is initialized to is a function of T. The following equation determines the counter's initialization:

$$[-(T/2 \text{ rounded down})] \text{ modulo } N.$$

Initialization of both counters must occur when the clock is low.

In FIG. 3, a switch, S1 153, is shown that controls whether the inverted output or the true output of the differential driver 28 that receives the clock 12, will control the binary counter 151 and latch 25. The position of the switch is a function of T. If T is chosen to be an even value, S1 153 will be in position A 154, and if T is chosen to be an odd value, S1 153 will be in position B 155.

The above described embodiment of the invention transfers data accurately from system A 20 provided certain conditions, related to the delays are met. The delays in the system, DD0, DD1, ... DDN-1, D1, and D2, are of unknown values which are not desirable and must be overcome to successfully transfer data between the subsystems. The following equations delineate the conditions for accurate operation of the system described in FIG. 3.

$$D1+DDJ<D2+(T/2)* \text{cycle time} \tag{a}$$

$$D1+DDJ>D2+(T/2-N)* \text{cycle time For all J values from 0 to N-1.} \tag{b}$$

To understand the advantages of expanding the system 10 in FIG. 1 to N devices, as shown in FIG. 3, the following equations are set forth which delineate the conditions for conventional data transfers.

$$D1+DD<D2+1* \text{cycle time} \tag{c}$$

$$D1+DD>D2 \tag{d}$$

The above equations demonstrate that large values of T provide an advantage by allowing for large values of the DD delay. When T is chosen to be at its maximum value (2N), equation (a) becomes $$D1+DDJ<D2+N* \text{cycle time}$$

which provides N times more transmission time than the conventional data transfer system delineated in equation (c). Small values of T provides for relief against the operating condition set forth in equation (b). This permits operation even if D2 is large compared to D1. If T is chosen to be at the low extreme (1), equation (b) becomes $$D1 + DDJ > D2 - (N - \tfrac{1}{2})*\text{cycle time}.$$

Thus, selecting intermediate values of T provides improvement of the constraints in the operating conditions for conventional data transfers as set forth in equations (c) and (d).

Referring again to the drawings and now to FIG. 4, there is illustrated, a second embodiment of the invention. The system 50 comprises two subsystems referred to as system A 60 and system B 70. System A 60 is further referred to as the sending subsystem and system B 70 is further referred to as the receiving subsystem. System A 60 sends data and a forwarded clock to system B 70. Both systems operate under the same clock 52, therefore, this arrangement is a fully synchronous system. However, due to unknown inherent delays in the system 50, each subsystem clock is a delayed ("skewed") version of clock 52.

System A 60 consists of four latches and a differential driver 57. Two latches, 55 and 56 are configured in a divide by two arrangement. This is achieved by coupling latch's 55 $Q_1$ output to the $D_2$ input of latch 56 and then coupling latch's 56 $Q_2*$ output to the $D_1$ input of latch 55. The resultant output $Q_2*$ is a derivative of clock 52 at one half the frequency. The $Q_2$ output of latch 56 is coupled to the input of latch 54. Clock 52 is coupled to system A 60, through an unknown delay of D1 58, to the input of the differential driver 57. The inverted output of the differential driver 57 (hereinafter "CLOCK A L 76") is coupled to the clock inputs of latch 54 and latch 55. The other output of the differential driver 57 (hereinafter "CLOCK A H 75") is coupled to the clock inputs of latch 53 and latch 56. The data 51 is coupled to the input of latch 53.

System A 60 transmits data and a clock signal to system B 70. The data which is transmitted, TDATA 71, is coupled to system B 70, through an unknown D4 59 delay. RDATA 72, which is the delayed version of TDATA 71, is coupled to the inputs of latch 62 and latch 63 of system B 70. The clock signal which is transmitted to system B 70 along with the data is called a "forwarded clock", shown as TF CLOCK 73. This signal, output by latch 54 on system A 60, is a derivative of the clock 52 and is used by system B 70 to latch the received data, RDATA 72. TF CLOCK 73 is transmitted from system A 60, coupled through an unknown D3 61 delay. RF CLOCK 74, which is the delayed version of TF CLOCK 73, is coupled to the clock input of latch 62 and the input of an inverter 79, which is coupled to the clock input of latch 63.

System B 70 has five latches, a differential driver, an inverter, and a multiplexer. The output of latch 62 is coupled to the A input of the multiplexer 66, and the output of latch 63 is coupled to the B input of the multiplexer 66. Latch 64 and latch 65 are configured in a divide by two arrangement. The output of the latch 64, $Q_3$, is the MUX SEL select signal, 80, which is coupled to the select input of the multiplexer 66. The $Q_{10}$ output of the multiplexer 66 is coupled to the $D_9$ input of latch 67. The $Q_9$ output of latch 67 is coupled to the rest of system B 70. Clock 52 is coupled to system B 70 through an unknown delay of D2 69, to the input of the differential driver 68. The inverted output of the differential driver 68 (hereinafter "CLOCK B L 77") is coupled to the clock input of latch 64. The other output of the differential driver 68 (hereinafter "CLOCK B H 78") is coupled to the clock inputs of latch 65 and latch 67.

As with the embodiment of FIG. 1, devices other than latches are contemplated to be used as the state devices in this embodiment. The same results would be achieved if either latches 55 and 56 and/or latches 64 and 65 were replaced by single synchronous flip flops arranged as one bit counters. Similarly, latches 53, 62, 63 and 67 could also be replaced with synchronous flip flops.

In this synchronous full bandwidth system, data is sent every cycle. Data is transferred from the sending subsystem to the receiving subsystem on only one wire, instead of two.

Figure 4:
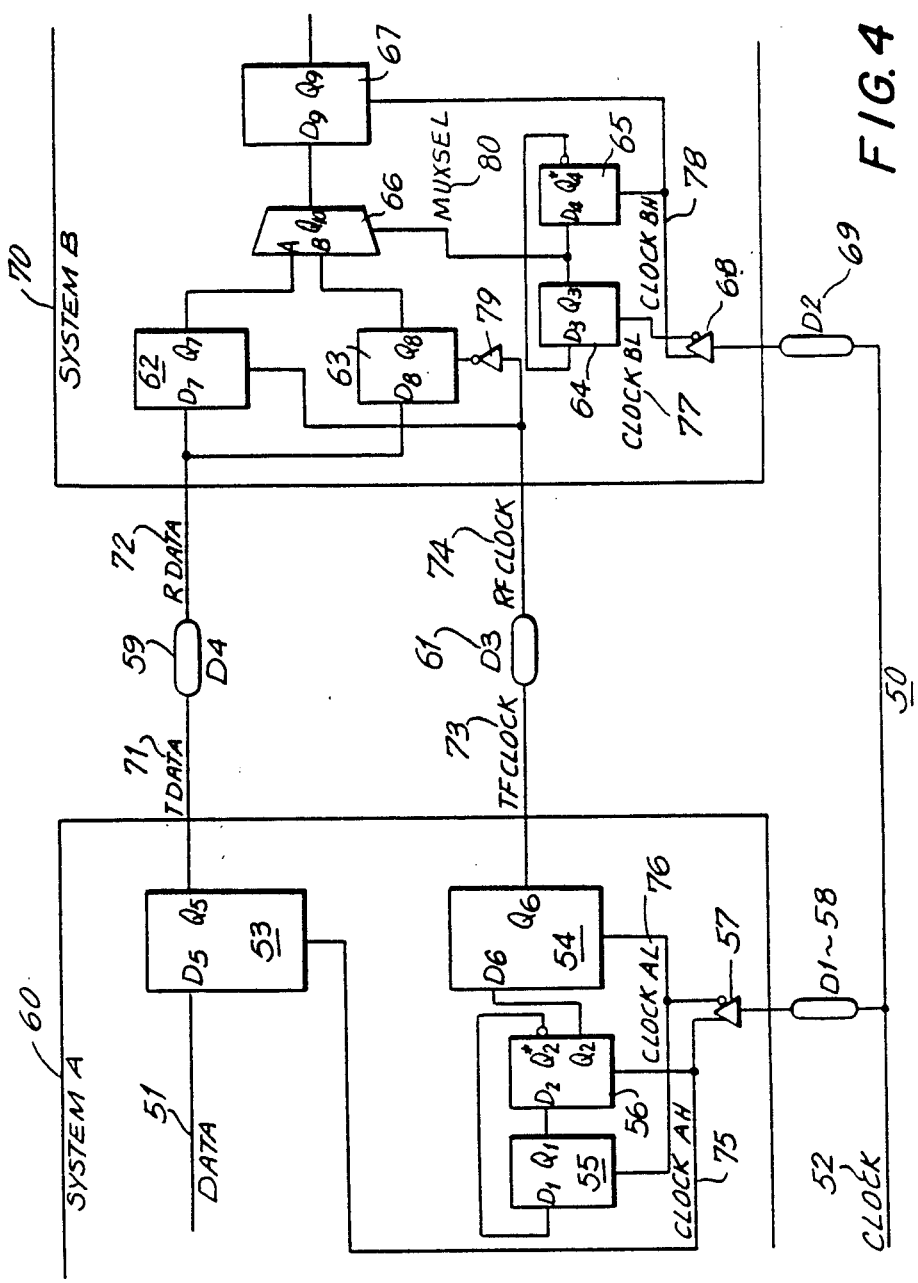
FIG. 4 is a block diagram of a second embodiment of the invention.

Referring to FIG. 4, between system A 60 and system B 70, there is a large, uncertain delay inherent in both the data transferred and the system clock 52. To overcome this inherent delay in the data and clock 52, a forwarded clock is sent from system A 60 to system B 70 to indicate to system B 70 when the data is sent and when system B should read the data. The forwarded clock is sent, by system A 60, at the same frequency as the data. The data and forwarded clock are loaded into latch 53 and latch 54 every cycle, but the forwarded clock changes state one half cycle after the data has changed state at the output of latch 53. Thus, the edge of the forwarded clock appears right in the middle of the data stable time of the data.

There is an attempt to match the path delays of the data and forwarded clock between system A 60 and system B 70. Physically, the paths are almost identical. Since both signals are derived from the same source and are sent to the same destination, their delays are relatively matched. Pursuant to the invention, the difference in the delays between the forwarded clock and the data must be less than one half cycle. This relationship can be accurately described by referring to FIG. 4, where D3 61 and D4 59 represent the forwarded clock and data delays, respectively. The relationship between the two delays must satisfy the following equation:

$$|D3 - D4| < \tfrac{1}{2} \text{ cycle time}.$$

Figure 5:
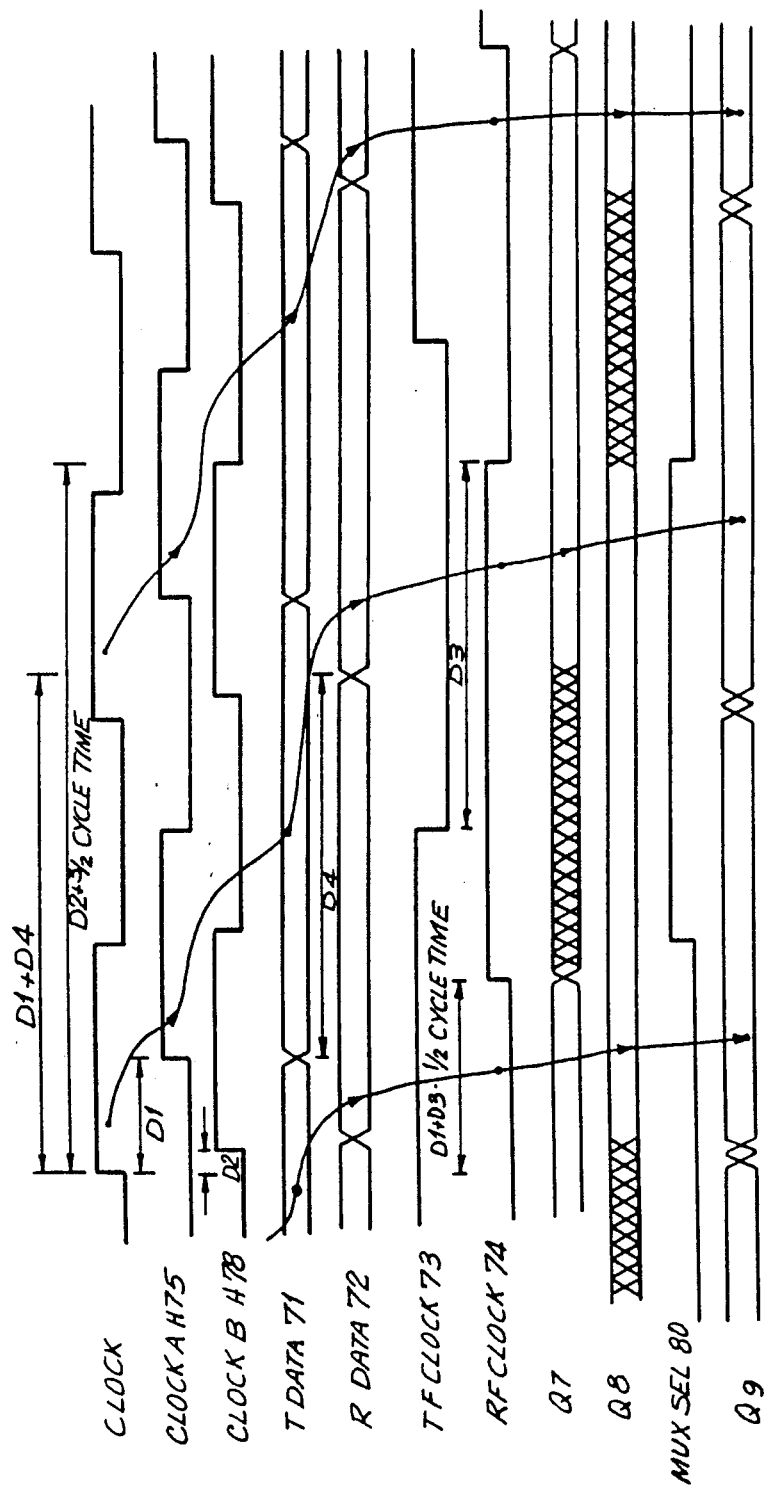
FIG. 5 is a timing diagram for the embodiment of FIG. 4.

Referring now to FIGS. 4 and 5 to explain the operation of the invention, upon system initialization, latch 55 and latch 64 are initialized to the same state to insure that the respective divide by two circuits are tracking each other. Data 51 changes before every rising edge of CLOCK A H 75. This data is allowed to pass through the latch 53 in system A 60 when CLOCK A H 75 goes high, which is D1 58 time after the rising edge of clock 52. Thus, TDATA 71 changes state and is transmitted to system B 70 when CLOCK A H 75 goes high. The data that arrives at system B 70 is RDATA 72, which is TDATA 71 with a delay of D4 59. While the data was being transmitted, the divide by two circuitry generates the forwarded clock, TF CLOCK 73, and transmits the signal to system B 70. The forwarded clock arrives at system B 70 as RF CLOCK 74 which is TF CLOCK delayed by D3 61 time. When RF CLOCK 74 is high, RDATA 72 passes through latch 62 to its $Q_7$ output to the A input of the multiplexer 66. MUX SEL 80 will be high sometime when this data is stable at the $Q_7$ output, therefore, the A input of the multiplexer is selected and the $Q_7$ output of latch 62 propagates through the multiplexer 66 to the input latch 67. This data then passes through latch 67, under the control of CLOCK B H 78, which is high, thus, the received data is now synchronous to system B 70.

While the previously discussed data propagates from latch 53 to latch 67, more than one cycle time may have passed which means new data 51 would be presented to the input of latch 53. System A 60 functions identically as described above, however, this next data word passes through latch 63, instead of latch 62, on system B 70 because latch 62 is closed and is unable to capture new data when RF CLOCK is low. Thus, RDATA 72 passes through latch 63 and is presented to the B input of the multiplexer 66 which is selected by MUX SEL 80 being low. This data passes through the multiplexer 66 and also passes latch 67, under the control of CLOCK B H 78 which is high, thus, the received data is synchronous to system B 70.

The above described sequence of receiving and transmitting data is repeated for every cycle of the clock since the data can potentially change state every cycle in this full bandwidth system. The sequence of events, according to the invention, assures that received data will be stable at the receiving state device long enough to comply with such device's setup and hold time requirements. Referring to FIG. 4, the setup time requirement of latch 67 is defined as $D1+D4-D2<3/2$ cycle time; the hold time requirement for latch 67 is defined as $D1+D3>D2$.

The above described sequence for transferring data from system A 60 to system B 70 works well provided certain conditions, related to the delays, are met. The delays in the system, shown by D1, D2, D3 and D4, are of unknown values which are not desirable and must be overcome to successfully transfer data between the subsystems. The following equations delineate the constraints on the delay values which insure proper operation of the system 50.

$|D3-D4| < \frac{1}{2}$ cycle time $D1+D4-D2 < 3/2$ cycle time $D1+D3 > D2$ $D1+D3 - \frac{1}{2}$ cycle time $< D2 + 3/2$ cycle time, As described above, data is safely captured into latch 62 and latch 63 of system B 70, utilizing the forwarded clock. The invention facilitates transferring this data into the rest of system B 70 which is running skewed under the system clock. In order to successfully transfer the data, it must be captured within its data stable window. If this embodiment of the invention employed conventional data transmission techniques, the window in which data would have to be transferred from system A to latch 67, to comply with the devices setup time requirements, would be:

$D1+D4-D2 <$ cycle time.

However, in this embodiment, the data stable window for transferring data from system A to latch 67 is increased by one half cycle as shown in the equations above. Thus, the invention provides a larger data stable time window to allow system B 70 to capture the data.

Figure 6:
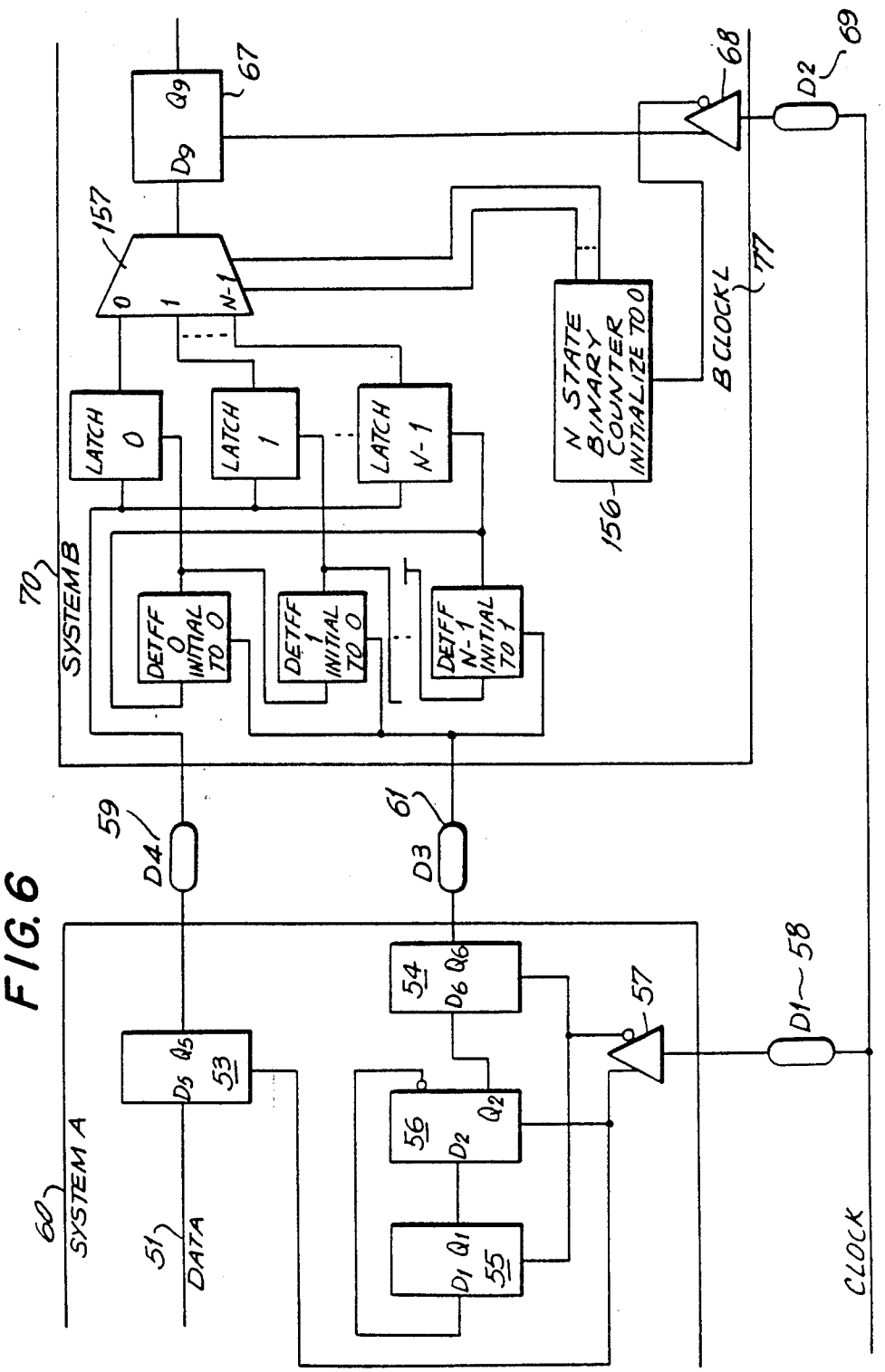
FIG. 6 is a block diagram of a generalization embodying the principles of the embodiment of FIG. 4.

Referring to FIG. 6, the second embodiment of the invention can be generalized as shown. This generalization is accomplished by allowing for the expansion to N receiving latches in system B 70 coupled to a multiplexer 157 with N inputs. System A 60 is not affected by the generalization of the second embodiment. Furthermore, the basic operation of the embodiment in FIG. 6 is fundamentally the same as FIG. 4 which was discussed above.

There are two differences between FIG. 4 and FIG. 6 to accommodate the generalization. First, the divide by two circuit arrangement utilized in system B 70 in FIG. 4 to control the select line of the multiplexer 66 is replaced by an N state binary counter 156. The counter's outputs are coupled to the select inputs of the N input multiplexer 157. To insure proper operation of the counter 156, it must be initialized to start counting at zero. This counter 156 is driven by CLOCK B L 77. The second difference between FIG. 4 and FIG. 6 is the addition of N double edge triggered flip flops arranged as a ring counter to couple R F CLOCK 74 to the clock inputs of the N receiving latches. The outputs of these flip flops are all initialized to zero except for the output of $N-1$ flip flop which is initialized to one.

Figure 7:
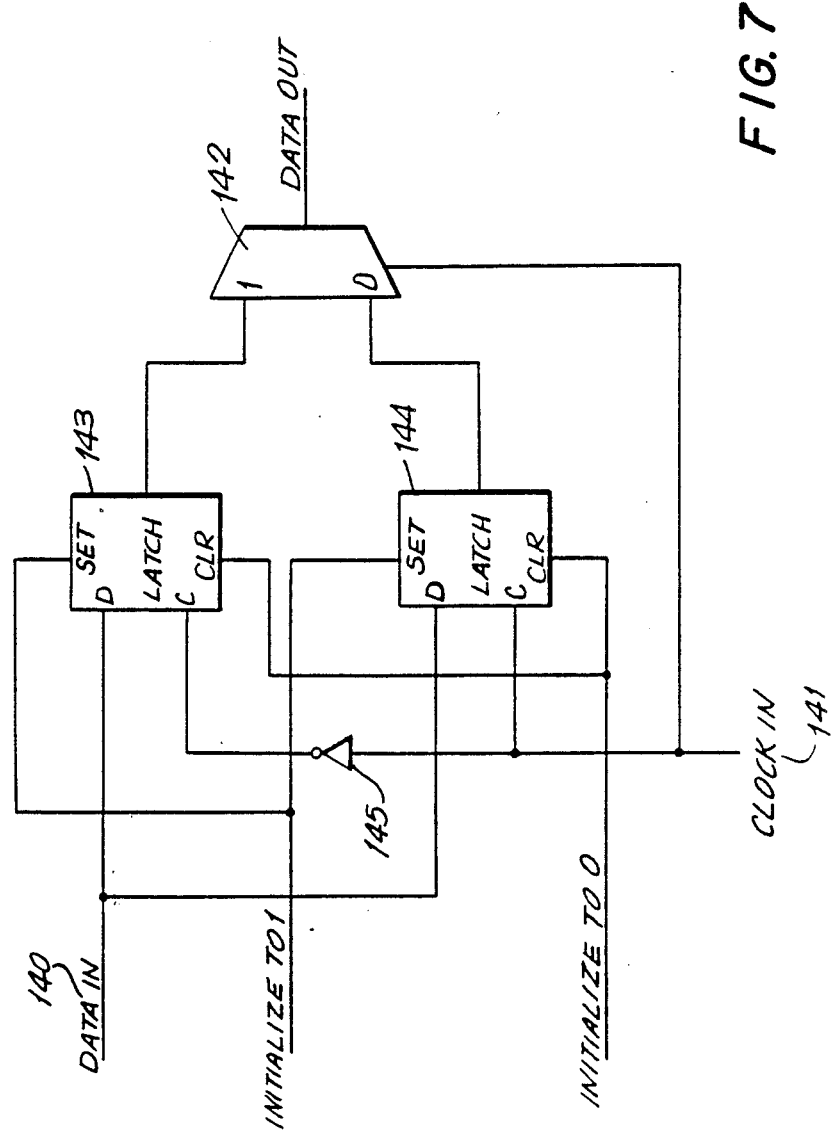
FIG. 7 is a block diagram of a double edge triggered flip flop.

Referring now to FIG. 7 to describe the operation of a double edge triggered flip flop (hereinafter "DETFF"), a DETFF comprises two parallel latches, an inverter, and a 2 to 1 multiplexer. A data signal 140 is coupled to the D inputs of the latches. Similarly a clock signal 141 is coupled directly to latch 144 and is coupled through an inverter to latch 143. The outputs of the latches are coupled to the inputs of the multiplexer 142. The clock signal 141 is also coupled to the multiplexer select line. The basic operation of a DETFF is that both latches are initialized to the same state. Data 140 is passed through latch 144 to the input of the multiplexer 142 when the clock 141 is high. When the clock 141 is high, the output of latch 143 remains at its prior state. When clock 141 is high, the output of latch 143 is selected at the multiplexer's input and passes to its output. When clock 141 goes low, the data 140 is captured in latch 144, while new data 140 passes through latch 143. Since clock 141 is low, the output of latch 144 is selected to pass through the multiplexer 142 to its output. On the next transition of the clock 141, which is low to high, the data 140 is captured in latch 143, while new data passes through latch 144. However, since clock 141 is high, the output of latch 143 is selected to pass through to the output of the multiplexer 142. Thus, every transition of the clock 141 results in new data 140 being presented at the output of the multiplexer 142. In a conventional edge-triggered flip flop, new data is presented at its output on only one edge of the clock.

To insure the proper operation of this embodiment in accurately transferring data between system A 60 and system B 70, certain operating conditions must be met. As discussed above, D1, D2, D3 and D4 are unknown, undesirable delays which must be overcome to guarantee the accurate transfer of data. The following equations delineate the conditions for proper operation.

| | |
|---|---|
| $\|D3-D4\| < \frac{1}{2}$ cycle time | (a) |
| $D1+D4-D2 < (N-\frac{1}{2})$ cycle time | (b) |
| $D1+D3 > D2$ | (c) |
| $D1+D3-\frac{1}{2}$ cycle time $< D2+(N-\frac{1}{2})$*cycle time | (d) |

The following equations delineate the proper conditions to be met in a conventional synchronous data transfer system.

$$D1+D4-D2 < \text{cycle time} \quad (e)$$

$$D1+D4 > D2 \quad (f)$$

By comparing equations (b) and (e), the advantages of the invention over a conventional system is shown since the invention allows for more delay (D1+D4). This increased tolerable delay approaches N times as much as in a conventional system for large N values. For a value of N equal to 2, which is the value chosen in FIG. 4, the D1+D4 delay can be up to 3/2 cycle time which is significantly better than the one cycle time which is available in the conventional system. Furthermore, from equations (a) and (c), it is demonstrated that for the invention $$D1+D4 > D2 - \tfrac{1}{2} \text{ cycle time.}$$

A comparison of this equation to the conventional system constraint delineated in equation (f) shows that the invention requires one half cycle time less minimum delay in the data path than a conventional system.

Another embodiment of the invention is a specific implementation of clock forwarding. As described above, clock forwarding is implemented by transmitting a clock signal with the data signals. The delays in the data signal path and clock signal path must be matched to a certain extent. The embodiment implements a double bandwidth bus.

Figure 8:
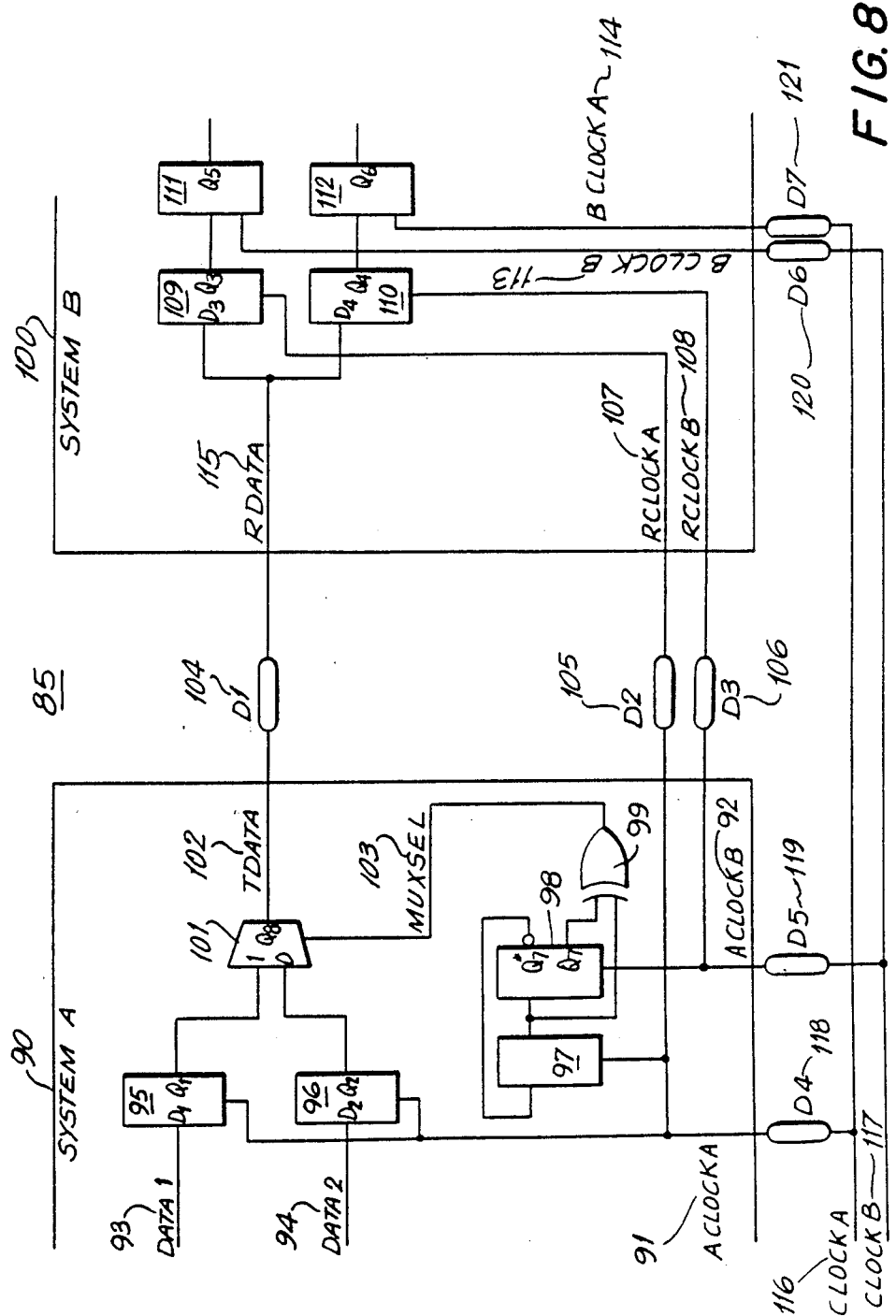
FIG. 8 is a block diagram of a third embodiment of the invention.

Referring now to the drawings and specifically to FIG. 8, there is illustrated a third embodiment according to the invention. The arrangement 85 comprises two subsystems referred to as system A 90 and system B 100. System A 90 is further referred to as the sending subsystem and system B 100 is referred to as the receiving subsystem. System A 90 sends data and two forwarded clocks to system B 100. Both systems operate under the same clocks, therefore, this configuration is a fully synchronous system.

Figure 9:
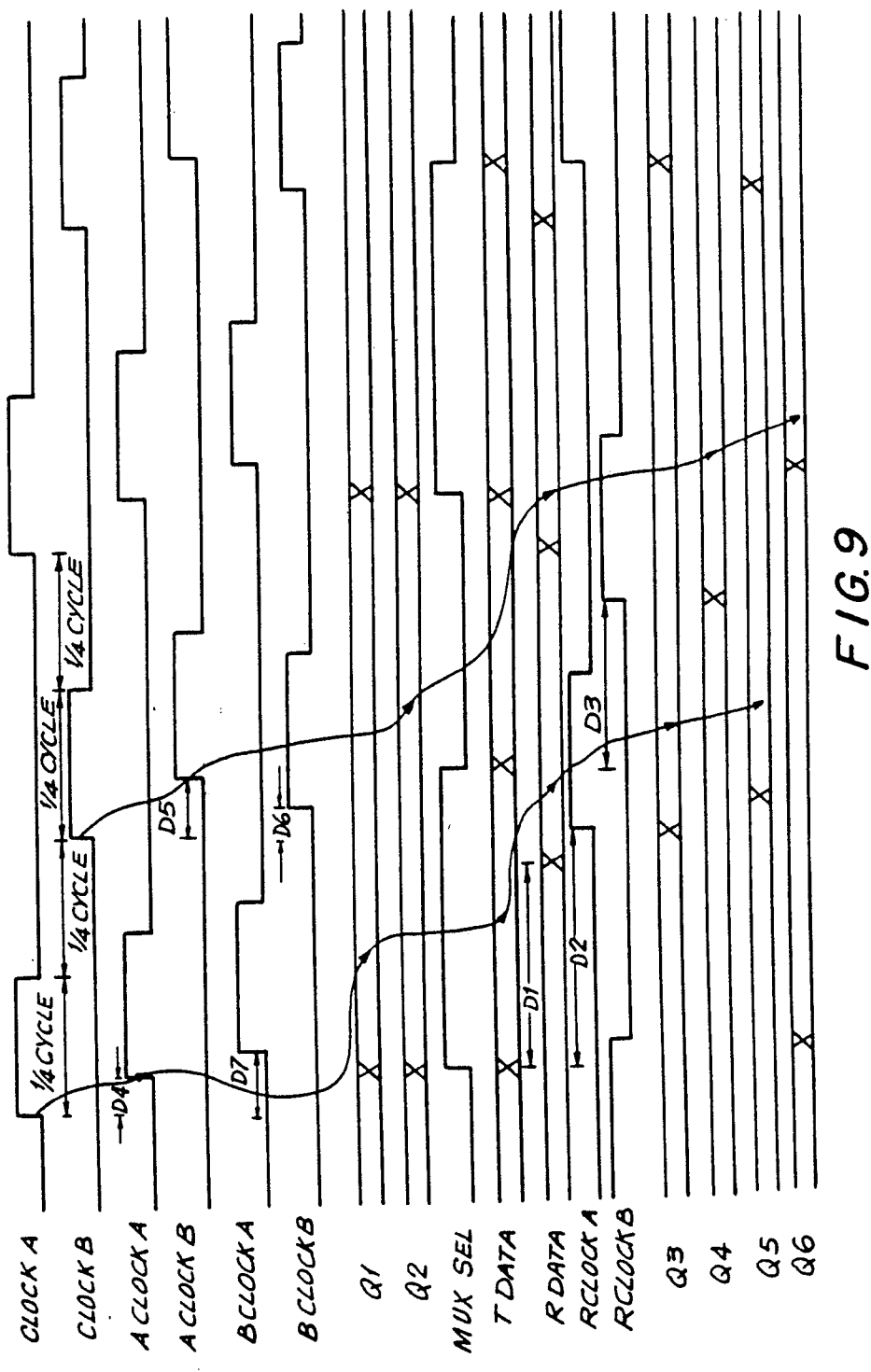
FIG. 9 is a timing diagram for the embodiment of FIG. 8.

System A 90 comprises four latches, an exclusive OR gate 99, and a multiplexer 101. Latch 97, 98 and the exclusive OR gate 99 are configured as a toggle circuit. This is accomplished by coupling the output of latch 97 to the input of latch 98, coupling the $Q_7{}^*$ output of latch 98 to the input of latch 97, and coupling the $Q_7$ output of latch 98 and the output of latch 97 to the exclusive OR gate 99. The resultant output, MUX SEL 103 is a derivative of clock A 91 and clock B 92. The output of the exclusive OR gate 99 is coupled to the multiplexer's select line and controls which input is selected. The data signals, DATA1 93 and DATA2 94, are coupled to the inputs of latch 95 and 96, respectively. The output of latch 95 is coupled to the 1 input of the multiplexer 101 and the output of latch 96 is coupled to the 0 input of the multiplexer 101. Clock A 116 is coupled, via an unknown delay of D4 118, to the clock inputs of latch 95, latch 96, and latch 97 as A clock A 91. Clock B 117 is coupled, via an unknown delay of D5 119, to the clock input of latch 98 as A clock B 92. Note that clock A 116 and clock B 117 are operating at the same frequency, however, they are not asserted at the same time as shown in FIG. 9.

System A 90 is coupled to system B 100 by three signals. The $Q_8$ output of the multiplexer 101 is coupled via an unknown delay of D1 104, to the $D_3$ input of latch 109 and the $D_4$ input of latch 110. It is across this path that TDATA 102 is transmitted from system A 90 to system B 100. A clock A 91 is coupled, via an uncertain delay of D2 105, to latch 109 of system B 100 and A clock B 92 is coupled, via an uncertain delay of D3 106, to latch 110 of system B 100. In this embodiment, A clock A 91 and clock B 92 are the forwarded clocks.

System B 100, in this configuration, comprises two sets of two parallel latches. Latch 109 and latch 110 receive the same data from system A 90 but are controlled by different clocks. This latch arrangement is able to present a larger data stable window to system B 100 therefore avoiding any violation of setup and hold time requirements of system B 100 state devices. Clock A 116 is coupled to system B 100, via an unknown delay of D7 119, as B clock A 114. Clock B 117 is coupled to system B 100, via an unknown delay of D6 120, as B clock B 113. The output of latch 109 is coupled to the input of latch 111 which is controlled by B clock B 113. The output of latch 110 is coupled to the input of latch 112 which is controlled by B clock A 114.

As with the earlier described embodiments, devices other than latches can be used as the state devices. Similar results are achieved if latches 97 and 98 are replaced by a single synchronous flip flop arranged as a one bit counter. Similarly, latches 95, 96, 109, 110, 111 and 112 could also be replaced with synchronous flip flops.

Referring again to FIG. 8, and also FIG. 9 to describe the operation of the invention, the data is changing every cycle in this full bandwidth system. System A 90 receives new DATA1 93 and DATA2 94 on every rising edge of A clock A 91. Thus, on the rising edge of A clock A 91, DATA1 93 passes through latch 95 to the A input of the multiplexer 101 as does DATA2 94 pass through latch 96 to the B input of the multiplexer 101. Since MUX SEL 103 is shown in FIG. 8 at this point to be high, the 1 input of the multiplexer 101 is selected and DATA1 93 propagates through and is transmitted as TDATA 102. TDATA 102 is transmitted, via an unknown delay of D1 104, and arrives at system B 100 as RDATA 115. This signal remains valid at the inputs of latch 109 and latch 110 until MUX SEL 103 goes low and selects DATA2 94. RDATA 115 passes through latch 109 under the control of R Clk A 107, which is A clock A 91 with an unknown delay of D2 105. As shown in FIG. 9, the $Q_3$ output of latch 109 remains at the input of latch 111 until the next rising edge of R Clk A 107 which is some time later. Thus, the B clock B 113 is given a large window of data stable time to capture the $Q_3$ output of latch 109 into latch 111, thereby synchronizing the received data with system B 100.

While DATA1 93 propagates from latch 95 to latch 111, DATA2 94 will be selected by MUX SEL 103 in the same cycle, allowing it to propagate as TDATA 102, through an unknown delay of D1 104, as RDATA 115. This sequence is initiated by the rising edge of A clock B 92. Thus, referring to FIG. 8, on the second transition of RDATA 115 caused by A clock B 92, the data passes through latch 110 under the control of R Clk B 108, which is A clock B 92 with an unknown delay of D3 106. The $Q_4$ output of latch 110 remains stable until the next low to high transition of R Clk B 108, thus giving B clock A 114 a large window of data stable time to capture the $Q_4$ output into latch 112, thereby synchronizing the received data with system B 100.

The above described sequence of receiving and transmitting data is repeated for every cycle of the clock since the data can potentially change state every cycle in this full bandwidth system. The sequence of events, according to the invention, assures that received data will be stable at the receiving state device long enough to comply with such device's set up and hold time requirements.

The above described sequence for transferring data from system A 90 to system B 100 works well provided certain conditions, related to the delays, are met. The delays in the system, shown by D1, D2, D3, D4, D5, D6, and D7, are of unknown values which are not desirable and must be overcome to successfully transfer data between the subsystems. The following equations delineate the constraints on the delay values which insure proper operation of the system.

$$|D1-D2| < \tfrac{1}{4} \text{ clock cycle}$$

$$|D1-D3| < \tfrac{1}{4} \text{ clock cycle}$$

$$D1+D4 < D6 + \tfrac{3}{4} \text{ cycle}$$

$$D1+D5 < D7 + \tfrac{3}{4} \text{ cycle}$$

$$D2+D4 < D6 + \tfrac{3}{4} \text{ cycle}$$

$$D3+D5 < D7 + \tfrac{3}{4} \text{ cycle}$$

$$D4+D2 > D6 - \tfrac{1}{4} \text{ cycle}$$

$$D3+D5 > D7 - \tfrac{1}{4} \text{ cycle}.$$

What is claimed is:

1. A method for arranging data in a first system for accurately transmitting a series of data items to a second system, each of the first and second systems being coupled to a clock signal having a cycle time, wherein the clock signal is skewed between the first and second system and clock signal skew plus data transmission time exceeds the cycle time of the clock signal, comprising the steps of:
   (a) transmitting the data items serially along a data path in the first system;
   (b) coupling the data path to inputs of N state devices arranged in parallel in the first system;
   (c) coupling outputs of N state devices arranged in parallel to a plurality of data paths intercoupling the first and second systems;
   (d) sequentially enabling the N state devices to capture the data items being transmitted serially along the plurality of data paths in an interleaved manner through a continuous rotation among the N state devices; and
   (e) holding each one of the captured data items in one of the N state devices for a period of time which is greater than the cycle time of the clock signal.

2. A method for accurately receiving a series of data items transmitted from a first digital system to a second digital system, each of the first and second digital systems being coupled to a clock signal having a cycle time, wherein the clock signal is skewed between the first and second digital system and clock signal skew plus data transmission time exceeds the cycle time of the clock signal, comprising the steps of:
   (a) coupling each one of a plurality of data paths to corresponding inputs of a multiplexer in the second digital system;
   (b) coupling an output of the multiplexer to an input of a data item receiving state device in the second digital system;
   (c) sequentially selecting the inputs of the multiplexer through a continuous rotation among the inputs to transmit interleaved data items received on the plurality of data paths from the inputs serially to the output of the multiplexer; and
   (d) enabling the data item receiving state device to serially capture the data items on the output of the multiplexer.

3. A method for arranging data in a first system for accurately transmitting a series of data items to a second system, each of the first and second systems being coupled to a clock signal having a cycle time, wherein the clock signal is skewed between the first and second system and clock signal skew plus data transmission time exceeds the cycle time of the clock signal, comprising the steps of:
   (a) transmitting the data items serially along a first data path in the first system to N state devices arranged in parallel in the first system, each one of the N state devices having an output which collectively form a second data path which is an output of the first system, the second data path having a first transmission time delay, D4;
   (b) transmitting a forwarded clock signal along a clock path forming a forwarded clock output of the first system and having a second transmission time delay, D3; and
   (c) arranging the second data path and the clock path relative to one another such that $|D3 - D4|$ is less than one half of the cycle time.

4. A method for accurately receiving a series of data items transmitted from a first system to a second system, each of the first and second systems being coupled to a clock signal having a cycle time, wherein the clock signal is skewed between the first and second system and clock signal skew plus data transmission time exceeds the cycle time of the clock signal, comprising the steps of:
   (a) transmitting the data items serially along a data path intercoupling the first and second systems;
   (b) coupling the data path to inputs of N state devices in the second system;
   (c) coupling outputs of the N state devices in the second system to corresponding inputs of a multiplexer in the second system;
   (d) coupling an output of the multiplexer to an input of a data item receiving state device in the second system;
   (e) sequentially enabling the N state devices in the second system to capture the data items received along the data path in an interleaved manner through a continuous rotation among the N state devices;
   (f) holding each one of the captured data items in one of the N state devices for a period of time which is greater than the cycle time of the clock signal;
   (g) sequentially selecting the inputs of the multiplexer through a continuous rotation among the inputs to transit the interleaved data items from the inputs serially to the output of the multiplexer; and
   (h) enabling the data item receiving state device to serially capture the data items on the output of the multiplexer.

5. A method for accurately transmitting a series of data items between a first system and a second system, both the first and second systems being coupled to a first clock signal and a second clock signal, the first and second clock signals having a cycle time, wherein the first and second clock signals are skewed between the first and second systems and the first and second clock signals' skew plus data transmission time exceeds the cycle time of the first and second clock signals, comprising the steps of:
  (a) transmitting the data items serially along a data path coupling the first system to the second system, the data path having a first transmission time delay, D1;
  (b) coupling the first and second clock signals from the first system along forwarded clock paths to inputs of a first set of state devices in the second system, the first clock signal's forwarded clock path having a second transmission time delay, D2, the second clock signal's forwarded clock path having a third transmission time delay, D3; and
  (c) arranging the data path and forwarded clock paths relative to one another such that $|D1-D2|$ is less than one quarter of the cycle time of the first clock signal and $|D1-D3|$ is less than one quarter of the cycle time of the second clock signal.

6. A method for accurately transmitting a series of data items between a first system and a second system, both the first and second systems being coupled to a first clock signal and a second clock signal, the first and second clock signals having a cycle time, wherein the first and second clock signals are skewed between the first and second systems and the first and second clock signals' skew plus data transmission time exceeds the cycle time of the first and second clock signals, comprising the steps of:
  (a) transmitting the data items serially as an indirect function of the first and second clock signals in the first system along a data path coupling the first system to the second system, the data path having a first transmission time delay, D1;
  (b) coupling the data path to inputs of a first set of state devices arranged in parallel, the state devices being in the second system;
  (c) coupling the first and second clock signals from the first system along forwarded clock paths to the first set of state devices in the second system, the first clock signal's forwarded clock path having a second transmission time delay, D2, the second clock signal's forwarded clock path having a third transmission time delay, D3;
  (d) sequentially enabling the state devices in the first set of state devices as a function of the first and second clock signals transmitted across the forwarded clock paths to the second system to capture the data items being transmitted along the data path in an interleaved manner through a continuous rotation among the first set of state devices;
  (e) coupling outputs of the first set of state devices to a second set of state devices arranged in parallel in the second system;
  (f) enabling the first set of state devices as a direct function of the first and second clock signals transmitted across the forwarded clock paths to the second system to hold each one of the captured data items for a period of time which is greater than the cycle time of the first and second clock signals; and
  (g) enabling the second set of state devices as a direct function of the first and second clock signals in the second system to capture the data items on the outputs of the first set of state devices.

7. The method according to claim 6 wherein the data path and forwarded clock paths are arranged relative to one another such that $|D1-D2|$ is less than one quarter of the cycle time of the first clock signal and $|D1-D3|$ is less than one quarter of the cycle time of the second clock signal.

8. A digital system which comprises:
  (a) a first system comprising N state devices arranged in parallel;
  (b) a second system;
  (c) a clock signal having a cycle time coupled by a clock path to the first system and the second system, wherein the clock signal is skewed between the first and second systems and clock signal skew plus data transmission time exceeds the cycle time of the clock signal;
  (d) means for operating the N state devices to capture a series of data items being transmitted serially along a data path in a manner through a continuous rotation among the N state devices and to hold each one of the captured data items for a period of time which is greater than the cycle time of the clock signal.

9. A digital system which comprises:
  (a) a first system;
  (b) a second system coupled to the first system by a data path, the second system comprising a multiplexer having a plurality of inputs coupled to the data path and a data item receiving state device, an output of the multiplexer coupled to an input of the data item receiving state device;
  (c) a clock signal having a cycle time coupled by a clock path to the first system and the second system, wherein the clock signal is skewed between the first and second systems and clock signal skew plus data transmission time exceeds the cycle time of the clock signal;
  (d) the multiplexer adapted to sequentially select one of the plurality of multiplexer inputs through a continuous rotation to transmit a series of interleaved data items received from the first system across the data path serially to the output of the multiplexer;
  (e) the data item receiving state device adapted to capture the data items serially from the output of the multiplexer as a function of the clock signal.

10. A digital system which comprises:
  (a) a first system comprising N state devices arranged in parallel;
  (b) a second system comprising a multiplexer and a data item receiving state device, an output of the multiplexer coupled to an input of the data item receiving state device, the first system being coupled to the second system by outputs of the N states devices coupled to corresponding inputs of the multiplexer;
  (c) a clock signal having a cycle time coupled by a clock path to the first system and the second system, wherein the clock signal is skewed between the first and second systems and clock signal skew plus data transmission time exceeds the cycle time of the clock signal;
  (d) means for operating the N state devices to capture a series of data items being transmitted serially along a data path in a manner through a continuous rotation among the N state devices and to hold each one of the captured data items for a period of time which is greater than the cycle time of the clock signal;
  (e) the multiplexer adapted to sequentially select its input through a continuous rotation among the inputs to transmit the interleaved data items from the inputs serially to the output of the multiplexer; and (f) the data item receiving state device adapted to capture the data items serially from the output of the multiplexer as a function of the clock signal.

11. A digital system which comprises:
(a) a first system;
(b) a second system coupled to the first system by a data path and a forwarded clock path, the second system comprises N state devices arranged in parallel, a N input multiplexer and a data item receiving state device, the N state devices' outputs being coupled to corresponding inputs of the N input multiplexer, an output of the N input multiplexer being coupled to an input of the data item receiving state device;
(c) a clock signal having a cycle time coupled by a clock path to the first system and the second system, wherein the clock signal is skewed between the first and second systems and clock signal skew plus data transmission time exceeds the cycle time of the clock signal;
(d) the first system adapted to generate a forwarded clock signal as an indirect function of the clock signal in the first system, the clock forwarding signal being indirectly coupled to the N state devices in the second system via the forwarded clock path, the forwarded clock path having a first transmission time delay, D3;
(e) the first system coupled to the inputs of the N state devices in the second system by the data path, the data path having a second transmission time delay, D4, the data path and the forwarded clock path arranged relative to one another such that |D3−D4| is less than one half of the cycle time;
(f) the first system adapted to transmit a series of data items serially as a direct function of the clock signal in the first system along the data path;
(g) means for sequentially enabling the N state devices to capture the data items being transmitted along the data path in an interleaved manner through a continuous rotation among the N state devices; and
(h) means for holding each one of the captured data items in one of the N state devices in the second system for a period of time which is greater than the cycle time of the clock signal.

12. The digital system of claim 11 wherein the multiplexer adapted to sequentially select its inputs through a continuous rotation among the inputs to transmit the interleaved data items from the input of the multiplexer to the output of the multiplexer.

13. The digital system of claim 12 wherein the data item receiving state device is adapted to serially capture the data items on the output of the multiplexer.

14. A digital system which comprises:
(a) a first system;
(b) a second system coupled to the first system by a data path and a forwarded clock path, the second system comprises N state devices arranged in parallel, a N input multiplexer and a data item receiving state device, the N state devices' outputs being coupled to corresponding inputs of the N input multiplexer, an output of the N input multiplexer being coupled to an input of the data item receiving state device;

(c) a clock signal having a cycle time coupled by a clock path to the first system and the second system, wherein the clock signal is skewed between the first and second systems and clock signal skew plus data transmission time exceeds the cycle time of the clock signal;
(d) the first system adapted to generate a forwarded clock signal as an indirect function of the clock signal in the first system, the clock forwarding signal being indirectly coupled to the N state devices arranged in parallel in the second system via the forwarded clock path, the forwarded clock path having a first transmission time delay, D3;
(e) the first system coupled to the inputs of the N state devices arranged in parallel in the second system by the data path, the data path having a second transmission time delay, D4, the data path and the forwarded clock path arranged relative to one another such that |D3−D4| is less than one half of the cycle time;
(f) the first system adapted to transmit a series of data items serially as a direct function of the clock signal in the first system along the data path;
(g) means for sequentially enabling the N state devices to capture the data items being transmitted along the data path in an interleaved manner through a continuous rotation among the N state devices;
(h) means for holding each one of the captured data items in one of the N state devices in the second system for a period of time which is greater than the cycle time of the clock signal;
(i) the multiplexer adapted to sequentially select its inputs through a continuous rotation among the inputs to transmit the interleaved data items from the input of the multiplexer to the output of the multiplexer; and
(j) the data item receiving state device adapted to serially capture the data items on the output of the multiplexer.

15. A digital system which comprises:
(a) a first system comprising a set of state devices arranged in parallel and a multiplexer having an output;
(b) a second system, the second system comprising a first set of state devices having inputs and a second set of state devices, the output of the multiplexer in the first system coupled to the inputs of the first set of state devices in the second system by a data path, the data path having a first transmission time delay, D1, outputs of the first set of state devices being coupled to inputs of the second set of state devices;
(c) a first clock signal and a second clock signal, each having a cycle time, coupled by a first forwarded clock path and a second forwarded clock path, respectively, to the first system and the second system, the first and second forwarded clock paths having second and third transmission time delays, D2 and D3, respectively, the first and second clock signals being forwarded along the forwarded clock paths from the first system to the first set of state devices in the second system;
(d) the data path and the first forwarded clock path arranged relative to one another such that |D1−D2| is less than one quarter of the cycle time of the first clock signal;
(e) the data path and the second forwarded clock path arranged relative to one another such that

|D1−D3| is less than one quarter of the cycle time of the second clock signal;

(f) the first system adapted to transmit the data items serially as an indirect function of the first and second clock signals in the first system along the data path;

(g) means for sequentially enabling the first set of state devices to capture the data items being transmitted along the data path in an interleaved manner through a continuous rotation among the first set of state devices;

(h) means for holding each one of the captured data items in one of the N state devices in the second system for a period of time which is greater than the cycle time of the clock signal;

(i) the second set of state devices adapted to capture the data items on the outputs of the first set of state devices as a direct function of the first and second clock signals in the second system.

* * * * *